United States Patent [19]

Hardie et al.

[11] Patent Number: 5,407,461
[45] Date of Patent: Apr. 18, 1995

[54] METHOD FOR PROTECTING THE REFRACTORY LINING IN THE GAS SPACE OF A METALLURGICAL REACTION VESSEL

[75] Inventors: Gregory J. Hardie, East Freemantle, Australia; Paul-Gerhard Mantey, Sulzbach-Rosenberg, Germany; Mark P. Schwarz, Victoria, Australia

[73] Assignee: Technological Resources Pty. Limited, Melbourne, Australia

[21] Appl. No.: 134,816

[22] Filed: Oct. 12, 1993

[30] Foreign Application Priority Data

Oct. 16, 1992 [DE] Germany .................. 42 34 973.7

[51] Int. Cl.⁶ .............................................. C21B 11/00
[52] U.S. Cl. ...................................................... 75/501
[58] Field of Search .......................................... 75/501

[56] References Cited

U.S. PATENT DOCUMENTS 4,861,368  8/1989  Brotzmann ..................... 75/501

Primary Examiner—Peter D. Rosenberg
Attorney, Agent, or Firm—Nikaido, Marmelstein, Murray & Oram

[57] ABSTRACT

The invention relates to a method for protecting the refractory lining of a metallurgical reaction vessel containing a smelt consisting of metal and slag, the reacting agents for the smelt being fed to the metal bath through introducing means disposed below and above the bath surface, and the gases escaping from the smelt being afterburned with oxidizing agents in the gas space, i.e. in the space above the still smelt, whereby gaseous reacting agents and/or gases acting inertly in the metal bath are fed to the smelt below the bath surface, and the total refractory lining surface in the gas space of the metallurgical reaction vessel is wetted by partial amounts of smelt in the form of drops, splashes, liquid portions rising or ejected eruptively and like a fountain and/or by wave or sloshing motion of the smelt.

12 Claims, 1 Drawing Sheet

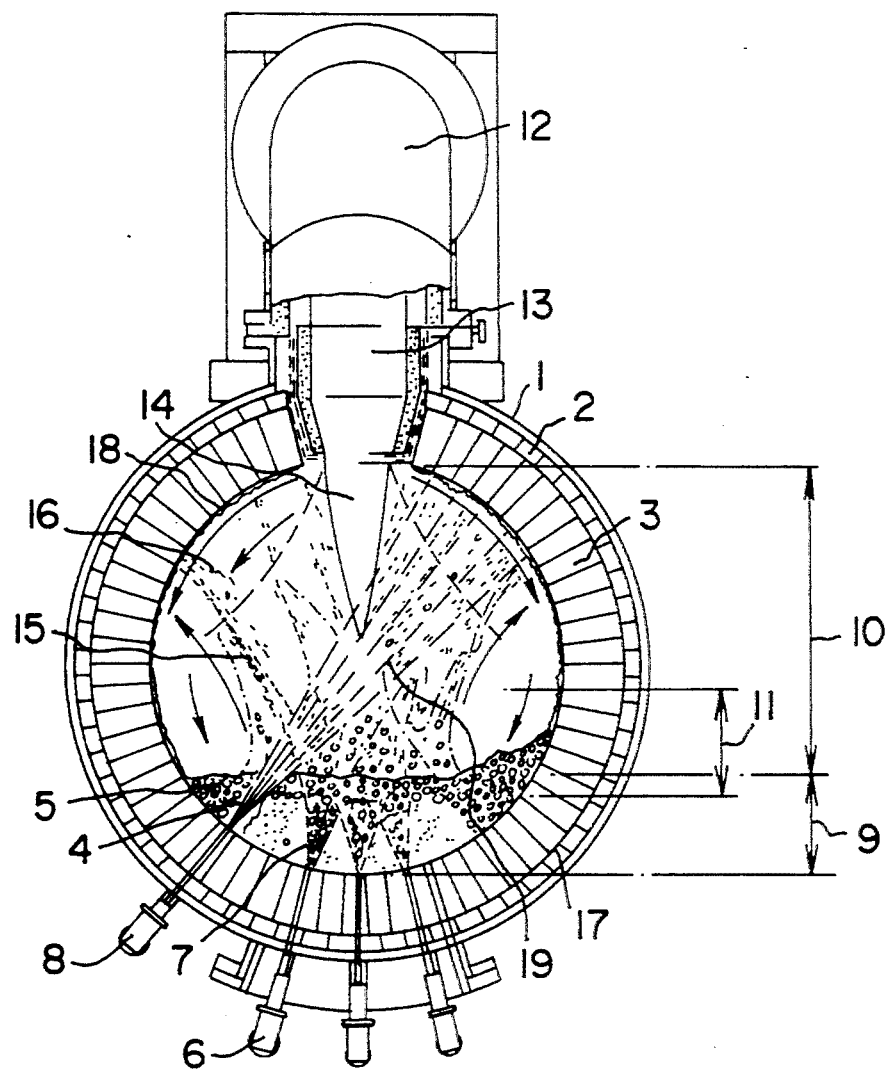

METHOD FOR PROTECTING THE REFRACTORY LINING IN THE GAS SPACE OF A METALLURGICAL REACTION VESSEL

The present invention relates to a method for protecting the refractory lining of a metallurgical reaction vessel containing a smelt consisting of metal and slag, the reacting agents for the smelt being fed to the metal bath through introducing means disposed below and above the bath surface, and the gases escaping from the metal bath being afterburned with oxidizing agents in the gas space, i.e. in the space above the still smelt.

The prior art includes a number of metallurgical processes in which burnable gases are partly or fully burned in the smelting and reaction vessels above the bath surface. In the broad sense, this full gas combustion above the smelt already takes place in the Siemens-Martin furnace with the resulting heat being transferred to the bath.

With the Kaldo steelmaking process and the Dored process developed from it for the smelting reduction of iron ores, attention was drawn for the first time to the problems that arise with the refractory lining upon afterburning of the reaction gases above the iron smelt due to the high temperatures. For example, a publication about the Kaldo process in Iron & Steel, August 1958, pages 419 to 423, states figures on the lining of the rotating converter and its durability, which indicate rates of wear of about 4 to 7 mm per batch. These values are a factor of ten higher than comparative data from current oxygen converters for steelmaking. At the time the high lining wear of rotating converters was attributed, on the one hand, to the change of temperature due to the wetting of the refractory material with smelt and, on the other hand, to the oxidation of iron droplets on the lining surface. The effects of the high refractory consumption on the Dored process are indicated impressively by a bibliographic study on the direct reduction of iron ore by the Mining Colleae of Leoben from 1976. There it reads in conclusion, "The consumption of refractory substances in the operational plant (Dored process) was very much higher than previously expected. Since this problem could not be solved even by special studies the operational plant was shut down in 1968."

After the rapid development of steelmaking in the basic top-blowing converter, the idea of afterburning reaction gases from the iron smelt in the converter and utilizing the resulting heat to improve the energy balance in the converter was focused on by steelmakers again only later, after the introduction of bottom-blowing OBM converters. In the early seventies some patents were filed that are concerned with afterburning the reaction gases, mainly CO and $H_2$, in the converter by supplying oxygen. Representative examples are U.S. Pat. No. 3,839,017 and East German patent no. 101 916. However simple afterburning, as described in these protective rights, led to premature refractory wear in the upper converter space, and no measurable improvement could be detected in the thermal balance of the steel refining process.

Only with a new oxygen top-blowing technique, described for the first time in German patent no. 27 55 165, can afterburning be performed in a steelmaking converter such that the resulting heat fully benefits the smelt and thus the thermal balance in the refining process. The essential feature of this method is to feed 20 to 80% of the amount of fresh oxygen to the smelt during a substantial part of the refining period through one or more gas jets directed onto the bath surface that act as free jets in the converter gas space, and to inject the remaining amount of oxygen below the bath surface.

In the gas space these free jets cover a certain distance within which they suck in considerable amounts of converter waste gas. The gas jet, that comprises mainly CO and $CO_2$, hits the surface of the smelt at a temperature that is considerably higher than the bath temperature and is an estimated 2500° C. This method does not clearly increase the lining wear in the gas space of the converter, but it only attains degrees of afterburning of between 20 and 25% at a high efficiency for heat retransfer to the smelt of about 80 to 90%.

German patent no. 39 03 705 relates to a method and apparatus for afterburning reaction gases and the use of this method, and it is characterized in that the gas jet or jets of oxidizing gases are blown onto the bath surface through one or more tuyères with a twist. This method is used in steelmaking, in the smelting reduction of iron ore and in coal gasification in an iron bath. By varying the swirl coefficient one can control the afterburning reliably between 40 and 80% and the efficiency of retransferring the energy obtained from afterburning to the iron smelt is between 80 and 90%.

At these high degrees of afterburning very high temperatures occur in the gas space of the reaction vessel despite good heat retransfer to the smelt. As far as the relations are known, gas temperatures of more than 2700° C. can be calculated. This process control with a high degree of afterburning involves a great danger of premature wear in the refractory vessel lining due to thermal overstressing.

To avoid high temperatures in the gas space of the reaction vessel and the related potential problems, the smelting reduction method in European patent application no. 04 18 627 treads a different path. The afterburning of the reaction gases takes place in a foamed slag layer. According to the patent application the oxygen is top-blown with a lance and circulation gas simultaneously fed through tuyères disposed below the bath surface. This process is characterized in that a minimum amount of slag of 2000 kg per $m^2$ bath surface must be present. It attains degrees of afterburning of over 40% with a heat retransfer of 90%.

As indicated by the prior art, methods are known for obtaining high degrees of afterburning above an iron smelt. There are also concepts for keeping the premature wear of the vessel lining within limits at an afterburning up to about 45% in order not to jeopardize the economy of the overall method. However there is no accordingly resistant refractory material for gas space temperatures over 2000° C. or a method for protecting the vessel lining from such high temperatures.

The invention is accordingly based on the problem of providing a method that makes it possible to protect the refractory lining in the gas space of a metallurgical reaction vessel in order to prevent premature wear of the refractory lining in the gas space despite the high temperatures during afterburning of the reaction gases. It is a further goal of the invention to prolong the life of the metallurgical reaction vessel, thereby improving the economy of the production methods for steel and ferroalloys, of coal gasification in an iron bath, of the smelting reduction of ferriferous ores and of the production methods for nonferrous metals.

This problem is solved by the inventive method by feeding gaseous reacting agents and/or gases acting inertly in the metal bath to the smelt below the bath surface, and wetting the total refractory lining surface in the gas space of the metallurgical reaction vessel by partial amounts of smelt in the form of drops, splashes, liquid portions rising or ejected eruptively like a fountain and/or by wave and sloshing motion of the smelt.

The object of the invention is a method for protecting the refractory lining of a metallurgical reaction vessel containing a smelt consisting of metal and slag, the reacting agents for the smelt being fed to the metal bath through introducing means disposed below and above the bath surface, and the gases escaping from the smelt being afterburned with oxidizing agents in the gas space, i.e. the space above the still smelt, characterized in that gaseous reacting agents and/or gases acting inertly in the metal bath are fed to the smelt below the bath surface, and the total refractory lining surface in the gas space of the metallurgical reaction vessel is wetted by partial amounts of smelt in the form of drops, splashes, liquid portions rising or ejected eruptively like a fountain and/or by wave or sloshing motion of the smelt.

A further object of the invention is the use of the stated method for producing steel and ferroalloys, for smelting reduction of ferriferous ores, for coal gasification in an iron bath and for refining and producing nonferrous metals.

The invention is based on the finding that, contrary to previous assumptions, a gas supply to the smelt below its bath surface that leads to strong bath motion of the smelt with partial amounts of smelt hitting the gas space lining in the form of drops, splashes, liquid portions rising or ejected eruptively like a fountain and wave and sloshing motion of the smelt reduces the refractory wear in the gas space of the reaction vessel. According to the invention this ebullient bath motion with smelt fractions ejected like a fountain onto the wall surface in the gas space of the reaction vessel is desirable. This finding is surprising since the prior art assumes that the refractory lining in the gas space of the reaction vessel shows clearly increasing wear when the lining surface is wetted with smelt, e.g. in a rotating drum converter, and at high degrees of afterburning due to the high gas temperatures in the top-blowing jet.

In known methods, e.g. the Kaldo rotating converter with its fast alternation between wetting of the lining surface by the smelt during rotary motion and subsequent high thermal load due to the afterburning gas jet, the refractory consumption in particular in this upper converter area has taken on forms that endanger the economy of the process. In the combination-blowing KMS steelmaking converter the increase in afterburning up to about 30% likewise leads to premature wear in the gas space or hood of the vessel.

The finding on which the inventive method is based, that the refractory durability in the gas space of the metallurgical reaction vessel is simultaneously improved at an increase in the degree of afterburning in the vessel to values of over 30% up to 85% and high heat retransfer to the smelt of over 70% to 90% and at gas flow rates in the underbath tuyères that cause high bath motion of the smelt with drops, splashes and smelt fractions ejected like a fountain onto the lining surface, is all the more surprising and unpredictable. The size relation of the ejected smelt fractions, e.g. whether they are drops, large splashes, smelt fractions rising or ejected eruptively like a fountain or smelt brought to the lining surface by wave and sloshing motion, plays no recognizable part. The only important thing is that the total lining surface in the gas space of the reaction vessel is wetted with smelt. Whether the layer thickness of this wetting also has an influence has not been clearly detectable up to now, so that any layer thickness, large or small, even or uneven, is to be assumed.

According to the invention the wetting of the refractory lining surface in the gas space is controlled by the smelt located in the reaction vessel via the flow rates of the gases conducted into the smelt through the underbath tuyères, i.e. the gaseous reacting agents and the gases acting inertly in the metal bath. Flow rates between 0.2 $Nm^3/min.t$ and 30 $Nm^3/min.t$, preferably flow rates between 2 $Nm^3/min.t$ and 10$Nm^3/min.t$, have proved useful at a minimum filling height of the smelt in the reaction vessel. This minimum filling height is based on the still bath surface and should be more than 0.3 m, preferably more than 0.5 m.

An important feature of the invention is that the flow rates of the gases conducted into the smelt below the bath surface are seen and controlled in relation to the level of the molten bath and to the maximum reaction vessel height. A first step is the relation of the flow rates to the ton of molten bath in the reaction vessel and the minimum filling height of the smelt in the reaction vessel.

Before the relations between gas flow rate, bath level and gas space height are dealt with in more detail, the operating regime of the smelt and the gas space thereabove will be described as it presents itself upon application of the inventive method. Gas is blown into the smelt through the underbath tuyères at such a high flow rate that parts of the smelt rise like a fountain from the bath surface. The speed of the gases and the smelt is high enough to entrain the liquid to the lining surface like a fountain as a free jet or jets, thereby wetting it. This operating regime must be clearly distinguished from the known motion of a molten bath that is more like boiling, cf. the blowing behavior of a steelmaking converter, with only splashes and drops breaking away. It is an essential feature of the invention to adjust an operating regime of the smelt in the metallurgical reaction vessel whereby partial amounts of smelt break away from the bath surface like a fountain at sufficient speed and pass to the surface of the vessel lining in the gas space, thereby wetting it.

To describe this inventive operating regime with adequate wetting of the lining surface including optimal injection conditions for the gases below the bath surface, clearly and reproducibly for different metallurgical reaction vessels, a formulary relation has been developed on the basis of various model experiments and mathematical models with consideration of the kinetic energy and the gas buoyant forces in the smelt. It has turned out that the fountain-like spray height $h_f$ [m] corresponds approximately to the quotient of the gas flow rate $Q_v$ [m$^3$/sec] per tuyère over the bath depth $h_b$ [m] with the exponent $\frac{2}{3}$, $$h_f \sim (Q_v/h_b)^{\frac{2}{3}}$$

or $$h_f = 2.3(Q_v/h_b)^{\frac{2}{3}}$$

from which the following formulary relation is derived for wall wetting under optimal gas injection conditions:

$(h_r/h_f)$ or $(h_r/((Q_v/h_b)^{\frac{1}{3}})) \leq 2.3$ preferably $<1.7$ whereby $h_r$ corresponds to gas space height [m], with $h_f$ being greater than $h_r$.

According to the formula a value smaller than or equal to 2.3, preferably smaller than 1.7, is to be adjusted. $Q_v$ is the gas flow rate for one tuyère correctly with the pressure and the temperature at the tuyère mouth. The inventive method is of course operated with more than one tuyère, the distance between the tuyères being at least such that the injection plumes do not overlap when they form in the smelt above the underbath tuyères with an aperture angle of about 20°. The relation between bath depth $h_b$ [m] and tuyère diameter d [m] must also be heeded. The quotient $h_b/d$ should be set at values greater than 20. If this relation is heeded no gas is blown through the smelt under customary operating conditions so that so-called blow-throughs are avoided.

It is also within the scope of the invention to operate additional underbath tuyères with inertly acting gases in some cases to wet the lining surface in the gas space of the reaction vessel selectively without obeying the stated formulary relations. As inert gases or gases acting inertly in the smelt one can use for example argon, nitrogen, CO or similar gases and mixtures thereof. These special wetting tuyères can serve to wet the lining surface at the blind angle of the normal underbath tuyères. They can also be used in areas with low bath depth for example. These special wetting tuyères are thus not designed in accordance with the above formulae and accordingly do not cause the eruptions of smelt fractions rising like a fountain dominated by kinetic energy. The wetting tuyères instead utilize the kinetic energy of the inert gases entering the smelt at high speed and entrain splashes and drops to the lining surface. These wetting tuyères are used only in individual cases and mainly in the area of low bath depth, and since the injected inert gases do not react with the smelt the operation of these special tuyè res does not disturb the course of the inventive method.

To obtain optimal preconditions for high degrees of afterburning of the reaction gases emerging from the smelt in the gas space of the metallurgical reaction vessel one injects the oxidizing agent, mainly air, oxygen or mixtures thereof, toward the bath surface with a twist and/or as a peripheral gas jet. The oxidizing gases may be preheated, e.g. air to temperatures between 1200° and 1500° C.

The gas space of the metallurgical reaction vessel contains the liquid portions referred to collectively as "partial amounts of the smelt" in the form of drops, splashes, smelt rising eruptively or ejected like a fountain. These liquid particles heat up in the afterburning gas jet, fall back into the smelt and thereby perform a considerable part of the energy transport of the heat resulting from afterburning to the smelt. The surface of the smelt is dissolved during the working of the process into a transition zone that is composed of a mixture of fractions of smelt, reaction gases and afterburned gases in the form of gas bubbles of different sizes and deeply extending gas plumes. This transition zone also has considerable importance for retransferring the afterburning heat to the smelt. Only the joint effect of advantageous top-blowing technology for the afterburning gases and the gas space permeated by smelt fractions and the transition zone leads to a heat retransfer to the smelt with favorable efficiencies of over 70% in particular at high degrees of afterburning.

While the temperatures in the described top-blown gas jet of oxidizing agents for afterburning in the gas space can assume values greater than 2700° C., the temperature of the smelt is normally adjusted between 1300° and 1600° C., preferably between 1350° C. and 1500° C., when the inventive method is carried out. It is an essential feature of the invention to adjust the temperature of the smelt clearly below the gas space temperature in the metallurgical reaction vessel. The temperature difference between the smelt and the gas space in the reaction vessel can be between 100° C. and 1400° C. These differential values are determined primarily by the heat charge during afterburning, i.e. by the degree of afterburning. The preheating temperature of the oxidizing agents used for afterburning the reaction gases of course also has an effect here, mainly the preheating temperature of the air, oxygen or any mixtures, including other mixed gases, that are suitable as oxidizing agents or serve to preheat the oxidizing gases.

According to the invention fountain-like portions of the smelt are flung onto the lining surface in the gas space of the reaction vessel, controlled by the flow rates of the gases conducted into the smelt below the bath surface, and this wetting of the lining causes the refractory material to be cooled on its surface in situ. This cooling directly at the places that would be exposed to the high gas temperature due to the afterburning of the reaction gases if they were not wetted with smelt, leads to a clear improvement in the durability of the refractory material in the gas space of the reaction vessel. While the lining in the gas space of the reaction vessel above the bath zone wears prematurely if the inventive method is not applied, uniform wear of the lining throughout the reaction vessel can now be obtained. The inventive method wets the refractory lining surface with smelt without a gap in the gas space of the reaction vessel and cools it altogether in situ.

The protection of the refractory lining in the gas space of a metallurgical reaction vessel by the inventive method is clearly superior to known methods chiefly in two respects. Firstly, the cooling of the lining surface takes place in situ and in particular continuously, i.e. without alternating temperature stress on the wall surface. Secondly, the partial amounts of smelt flung onto the lining surface simultaneously shield the lining from the thermal radiation of the afterburning gas jet, and a constant lining temperature is obtained which is only negligibly higher than the temperature of the smelt. The metal drops with their high reduction potential hit the lining surface and protect it from overheated, oxidized (high FeO content) slag which normally causes clear refractory wear.

Furthermore, the partial amounts of smelt sprayed continuously onto the wall surface and the smelt brought onto the refractory lining by wave and sloshing motion of the smelt result in an intensive cooling and shielding of the lining. Due to their constant renewal the wet layers cannot heat up to any great degree before being replaced by fresh smelt. Estimates of the temperature increase in the partial amounts of smelt when they pass through the gas space have yielded maximum values of about 50° C.

By contrast, the surface is completely wetted with smelt in known methods, e.g. in a rotating converter, but as soon as the lining emerges from the molten bath it is exposed to the high temperature of the afterburned reaction gases by thermal radiation and convection. This constant change of temperature is probably responsible for the well-known premature refractory wear in the gas space of such vessels.

According to the invention the surface of the refractory lining in the gas space of the metallurgical reaction vessel is completely wetted with smelt that is continuously replaced by new partial amounts ejected from the smelt in the vessel, and then either falls back off the lining surface or runs down it. Estimates of the partial amounts of smelt blown onto the lining surface yield values of at least about 50 kg/min.m² wall surface. This is of course merely a rough approximate value; what is essential to the invention is that the lining surface is wetted without a gap, whereby different mass fractions of the smelt can wet the surface of the refractory lining in different areas of the gas space of the reaction vessel.

The invention will now be explained in more detail with reference to a drawing and a nonrestrictive example.

BRIEF DESCRIPTION OF THE DRAWING

The FIGURE shows the cross section through a drum-shaped reaction vessel for smelting reduction of iron ores and ferriferous ores for producing iron and ferriferous alloys.

The drum-shaped reaction vessel has outer jacket 1 made of steel sheet and containing a refractory lining built up from insulating layer 2 and wear lining 3. Reaction gases are blown through underbath tuyères 6 into the smelt formed of iron bath 4 with slag layer 5 and form injection plume 7 in the smelt. Wetting tuyère 8 can also be seen.

Bath depth $h_b$ is marked by dimension 9 and gas space height $h_r$ by dimension 10. Dimension 11 additionally indicates the transition zone.

Top-blowing tuyère 13 is supplied via hot blast pipe 12 with hot air, i.e. air with a preheating temperature of 1250° C. This afterburning tuyère 13 blows afterburning jet 14 into gas space 10 of this smelting reduction vessel. The afterburned reaction gases from smelt 9 hit partial amounts 15 flung out of the smelt like a fountain and drops and splashes 16. These partial amounts of smelt in the form of drops, splashes 16 and eruptively ejected parts 15 and the parts of smelt in wave or sloshing motion 17 wet the lining surface shown by arrows 18. The phenomenon of lining surface wetting 18 is an essential feature of the invention, to which wetting tuyère 8 with its spray jet 19 also contributes.

A pilot converter for the smelting reduction of iron ore contains about 8 t of iron smelt with a carbon content of 3% and a temperature of 1450° C. A slag layer of 1.5 t floats on this molten bath, having a CaO content of 34%, SiO 26%, FeO 5%, MgO 12%, in accordance with an alkalinity of 1.3. About 46 kg/min of iron ore with a Fe content of 62% is blown into this iron smelt through the underbath tuyères. Simultaneously 22 kg/min of ground coal with a composition of 85% C, 3.0% $H_2$, 1.6% $0_2$, 0.7% S and an ash content of 7% is introduced into the bath. After an operating time of about 3 hours, 5 t of iron and 1.8 t of slag are tapped off from the smelting reduction vessel via a tap hole.

About 30 Nm³/min of reaction gas and 10 Nm³/min of inert gas escape from the smelt into the gas space and are afterburned there with 105 Nm³/min of hot air at a preheating temperature of 1150° C. An average degree of afterburning of 57% is obtained, that is retransferred to the smelt with a heat efficiency of 85%. Through six underbath tuyères and two additional wetting tuyères that are operated with 3 Nm³/min of nitrogen, 50 kg/min.m² lining surface of partial amounts of smelt, according to a rough estimate, is flung onto the lining surface in the gas space of the reactor and cools the refractory material in situ. After this pilot plant was operated for six months a uniform refractory consumption could be detected in the bath and gas zones of this smelting reduction vessel.

The method for protecting the refractory lining in the gas space of a metallurgical reaction vessel can be applied in the production of steel and ferroalloys, for the smelting reduction of ferriferous ores, in coal gasification in an iron bath and in the refining of nonferrous metals. For all metallurgical methods that feed reacting agents and in particular gaseous reacting agents to a molten bath below the bath surface, the inventive process is characterized by great flexibility in adapting to the special operating conditions of these methods. Modification of this process and its special adaptation to the various operating conditions in the abovementioned and similar metallurgical processes is within the scope of the invention. The essential features of this method are fulfilled, and one is within the scope of the invention, as long as the lining surface in the gas space of the metallurgical reaction vessel is cooled in situ by smelt brought against it that has a lower temperature than the temperature prevailing in the gas space.

We claim:

1. A method for protecting a refractory lining of a metallurgical reaction vessel containing a smelt comprising metal and slag, reacting agents for the smelt being fed to the metal bath through introducing means disposed below and above the bath surface, and gaseous reacting agents and/or gases acting inertly in the metal bath being fed to the smelt below the bath surface, and the gases escaping from the smelt being afterburned with oxidizing agents in the gas space, i.e. in the space above the still smelt, comprising wetting the entire surface area of said refractory lining in the gas space of the metallurgical reaction vessel with said smelt.

2. The method of claim 1, characterized in that the mass fractions of smelt that hit the refractory gas space surface and wet the lining in the form of drops, splashes, liquid portions rising or ejected eruptively like a fountain and/or through wave or sloshing motion of the smelt are adjusted to different ratios with one other.

3. The method of claim 1, characterized in that the wetting of the refractory lining surface in the gas space of the reaction vessel by the smelt is controlled via the flow rates of the gaseous reacting agents and/or gases acting inertly in the smelt that are fed to the smelt through underbath tuyères.

4. The method of one or more of claim 1, characterized in that the flow rates of the gaseous reacting agents through the underbath tuyères are controlled in relation to the level of the molten bath and the maximum reaction vessel height for wetting the total lining surface in the gas space of the reaction vessel.

5. The method of claim 1, characterized in that the following formulary relation between the flow rate of the underbath tuyères $Q_v$, the level of the molten bath $h_b$ [m] and the gas space height $h_r$ [m]

$$(h_r/((Q_v/h_b)^{\frac{2}{3}})) \leq 2.3$$

is maintained for wetting the lining surface in the gas space of the reaction vessel.

6. The method of claim 1, characterized in that the inside diameter d of each underbath tuyère in relation to the bath depth of the smelt—$h_b$—is designed to be greater than 20 according to the quotient $h_b/d$.

7. The method of claim 1, characterized in that underbath tuyères are additionally operated with inertly acting gases independently of the formulary relation only for selectively wetting the lining surface in the gas space of the reaction vessel.

8. The method of claim 7, characterized in that the temperature difference between the smelt and the gas space in the reaction vessel is adjusted between 100° and 1400° C.

9. The method of claim 1, characterized in that the refractory lining surface in the gas space of the reaction vessel is wetted with partial amounts of smelt of at least 50 kg/min.m² surface.

10. The method of claim 1, characterized in that the smelt in the reaction vessel is adjusted to bath temperatures clearly lower than the gas space temperature.

11. The method of claim 1, characterized in that the refractory material on the surface of the lining in the gas space of the reaction vessel is cooled in situ by being wetted with smelt.

12. The method of claim 1, characterized in that the refractory lining surface in the gas space of the reaction vessel is wetted with smelt continuously and completely.

* * * * *